United States Patent [19]

Spriggs et al.

[11] Patent Number: 4,844,960
[45] Date of Patent: Jul. 4, 1989

[54] TIME DETERMINATE FIRE PROTECTION BLANKET

[75] Inventors: Leonard C. Spriggs; William J. Chockey, both of Houston, Tex.

[73] Assignee: B & B Progressive Materials and Technologies, Inc., Houston, Tex.

[21] Appl. No.: 37,977

[22] Filed: Apr. 14, 1987

[51] Int. Cl.$^4$ .................. B32B 7/00; B32B 17/06; D02G 3/00

[52] U.S. Cl. .................. 428/34.5; 428/920; 428/921; 428/236; 428/246; 428/285; 428/328

[58] Field of Search .......... 428/36, 228, 236, 241, 428/246, 251, 285, 328, 325, 432, 446, 920, 921, 902

[56] References Cited

U.S. PATENT DOCUMENTS

| | | | |
|---|---|---|---|
| 2,720,269 | 10/1955 | Diacos | 169/1 |
| 2,726,977 | 12/1955 | See et al. | 154/44 |
| 2,801,427 | 8/1957 | Crocker | 5/354 |
| 3,881,978 | 5/1975 | Livingston et al. | 156/247 |
| 4,101,700 | 7/1978 | Rat, Jr. et al. | 428/131 |
| 4,210,070 | 7/1980 | Tatum et al. | 98/400 |
| 4,237,667 | 12/1980 | Palluci et al. | 52/221 |
| 4,273,365 | 6/1981 | Hagar | 285/229 |
| 4,273,821 | 6/1981 | Pedlow | 428/215 |
| 4,282,284 | 8/1981 | George | 428/251 |
| 4,375,493 | 3/1983 | George et al. | 428/246 |
| 4,414,251 | 11/1983 | Palmer | 427/407.1 |
| 4,428,999 | 1/1984 | George et al. | 428/246 |
| 4,452,279 | 6/1984 | Atwell | 138/126 |
| 4,493,945 | 1/1985 | Feldman | 174/68 C |
| 4,500,593 | 2/1985 | Weber | 428/902 X |
| 4,509,559 | 4/1985 | Cheetham et al. | 428/921 |
| 4,535,017 | 8/1985 | Kuckein et al. | 428/77 |
| 4,600,634 | 7/1986 | Langer | 428/220 |
| 4,612,239 | 9/1986 | Dimanshteyn | 428/920 |
| 4,702,861 | 10/1987 | Farnum | 428/921 |
| 4,767,656 | 8/1988 | Chee et al. | 428/902 X |

FOREIGN PATENT DOCUMENTS

| | | | |
|---|---|---|---|
| 1028072 | 2/1986 | Japan | 428/389 |
| 1132340 | 6/1986 | Japan | 428/920 |

OTHER PUBLICATIONS

Federal Register, "Part II Nuclear Regulatory Commission", p. 76606, Nov. 19, 1980.

Primary Examiner—Nancy A. B. Swisher
Attorney, Agent, or Firm—Hubbard, Thurman, Turner & Tucker

[57] ABSTRACT

A fire protective blanket construction providing multiple time protection for application to electrical conduit and cable trays to preserve operation of electrical circuitry carried by the cables in the event of exposure to fire. Comprising the prefabricated fire resistant blanket are back-to-back blanket sections separated by a moisture impervious metal foil. Disposed within the outer of the blanket section on the exterior side of the foil is a transversely extending envelope containing a selected thickness of trihydrated alumina in powdered form. When exposed to high temperature, the trihydrated alumina emits a steam vapor for protecting the article to which the blanket has been applied for a time period correlated to the thickness and other thermal properties of the individual elements comprising the blanket.

9 Claims, 2 Drawing Sheets

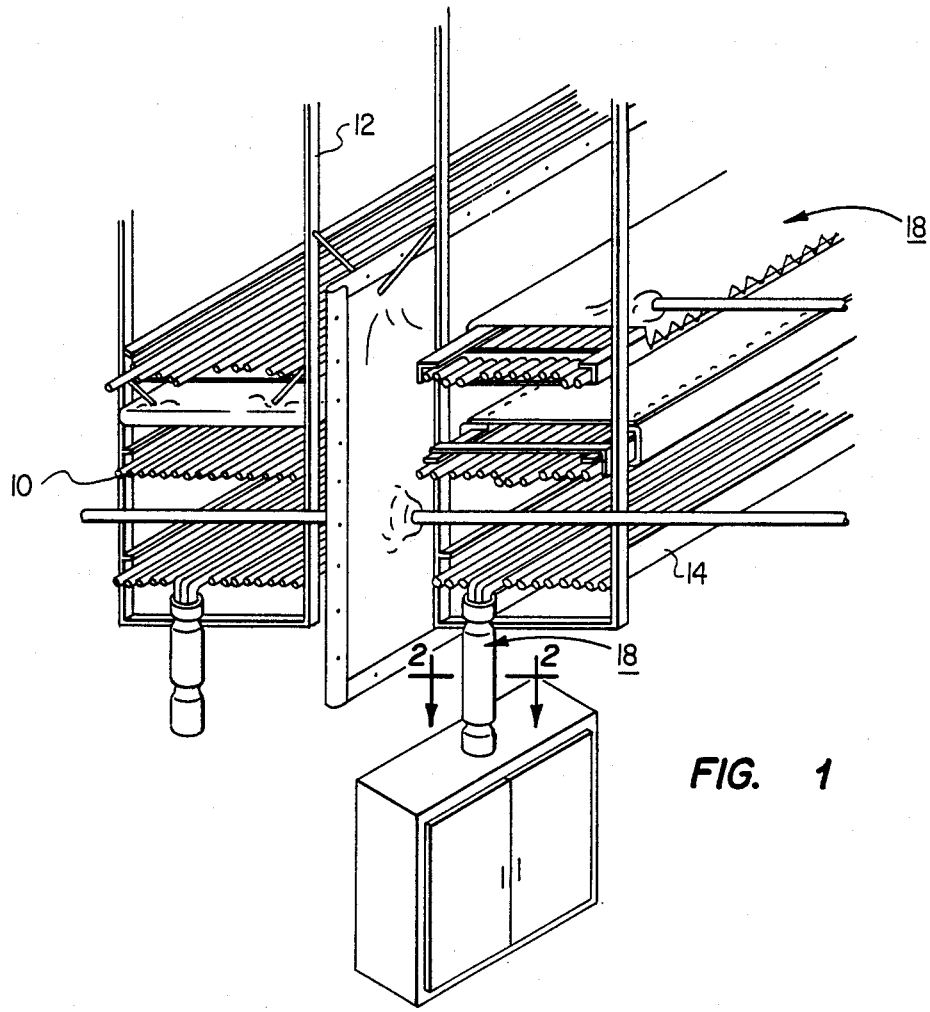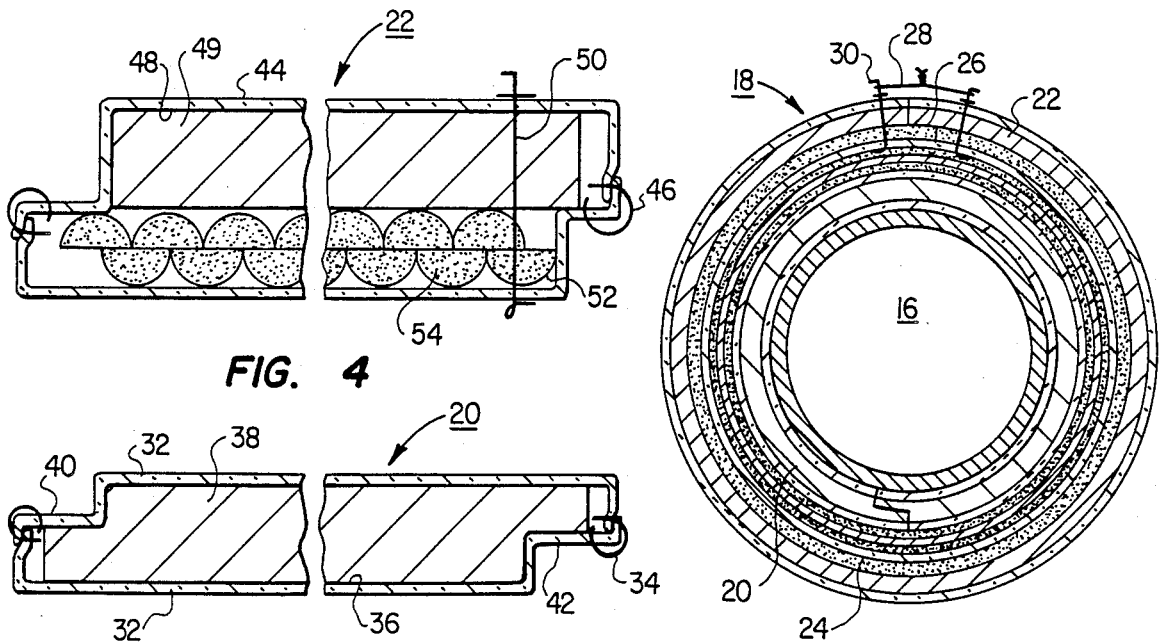

TIME DETERMINATE FIRE PROTECTION BLANKET

TECHNICAL FIELD

The field of art to which the invention pertains comprises the art of fire barrier compositions as related to fire protective blankets of a type affording time predicted protection for components to which the blankets are applied.

BACKGROUND OF THE INVENTION

The use of fire protection barriers such as blankets, tapes and/or rigid material of a variety of compositions are widely known and utilized. Exemplifying fire barriers of cloth which vary by composition and/or contemplated end use are the disclosures of U.S. Pat. Nos. 3,881,798; 4,101,700; 4,273,821; 4,282,284; 4,414,251; and 4,535,017. One or more of these prior patents have disclosed use of a flame resistant filler such as hydrous oxides, silicates and other hydrated substances which firmly bond the water and decompose with the heat of a fire. When exposed to fire they evolve large quantities of cooling, non-corrosive oxygen-displacing and fire protective water vapors. Disclosed for example in U.S. Pat. No. 4,273,821 is a mastic coating applied to a sheet-like carrier which may be wound as a tape about electric power or control cables. The tape serves to restrict fire propagation and prevent self ignition of cables from fires due to overloading or other electrical faults. U.S. Pat. No. 4,375,493 discloses refractory coating compounds of aluminum oxide, calcium oxide, etc. which when applied to a base fabric are said to afford the fabric insulating capability that can be maintained for about 20 minutes at temperatures in the range of 1800°–2000° F.

While it has therefore been known to protect electrical cables and cable trays utilizing blankets of heat insulating material, such materials have in that environment proven to themselves to create a problem. That is, it will be recognized that such materials function to only prevent external sources of heat from reaching the electrical conduit while preventing the dissipation of heat from the interior of the conduit or cable. On the other hand, prior attempts to utilize trihydrated alumina as a fire protection barrier composition have included incorporating the trihydrated alumina in a binder or other relatively rigid form. As a result the material has lacked sufficient flexibility for wrapping around a conduit or cable already in place.

Recent pronouncements of the U.S. Nuclear Regulatory Commission relying on ASTM E-119 have required fire protection applied to electrical cable in nuclear power plants to preserve the cable in tact for at least 3 hours so as to enable suitable shut down of the facility before power interruption can occur.

Despite recognition of the foregoing, a ready solution therefor has not heretofore been known.

SUMMARY OF THE INVENTION

This invention relates to multiple time (MT) fire protective barrier compositions. More specifically, the invention relates to a flexible form of fire protective barrier composition affording time determinate protection in the event of fire. Being in blanket form, the composition hereof is entirely suitable for wrapping about electrical conduit or cable in order to effect fire protection therefor for a prescribed predetermined time period sufficient to permit shut down of the affected facility.

In accordance with a preferred embodiment of the invention, the composition is formed of back-to-back superimposed sections assembled as a unitary structure comprising a blanket. Both sections are of thermally insulating composition. The outer section includes an envelope array of adjacent semi-cylinder pillow pockets formed of a fiberglass cloth and an outer ceramic cover. Contained in the pockets is a controlled thickness layer of trihydrated alumina in powder form. Intervening between the powder layer and the inner section is a thin sheet of metal foil forming a moisture barrier. When exposed to high temperature, as in the case of fire, the trihydrated alumina emits steam vapors for protecting the wrapped item for a time period correlated to the thickness of the powder. By virtue of this blanket construction, the moisture barrier precludes any emitted vapor from passing inwardly to the electrical cable so as to in effect create a one way heat barrier while concomitantly permitting cable heat to be conducted outwardly. Such blanket constructions can also be utilized in ships, petrochemical environments, etc., not only for electrical cables, but for any component meriting similar multiple time protection.

The advantages of the foregoing should be instantly apparent in not only enabling code compliance for protecting electrical cable in situations where maintaining electrical service is essential if not critical but in affording similar protection to other components for predictable time periods sufficient for plant shut done to be safely effected. Further virtue resides in the versatility of the blanket construction afforded by the ability to alter the effective time delay by selecting materials of appropriate thermal properties while matching the thickness of the trihydrated alumina for the selected multiple time barrier sought to be achieved. Moreover, the flexibility of the blanket enables direct application onto circular cross section cable conduit or the like without the need of intervening support structure thereabout. When wrapped, the opposed ends are secured together via a tie wire or the like such that in the event replacement should subsequently be required, the wrap can be easily and simply undone merely by removing the tie wire.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 1 is an isometric elevation of a cable installation utilizing the fire protection blanket hereof;

FIG. 2 is a sectional view taken substantially from the position 2—2 of FIG. 1;

FIG. 3 is an enlarged sectional view through the inner blanket section hereof;

FIG. 4 is an enlarged sectional view through the outer blanket section hereof;

DESCRIPTION OF THE PREFERRED EMBODIMENT

Figure 5:
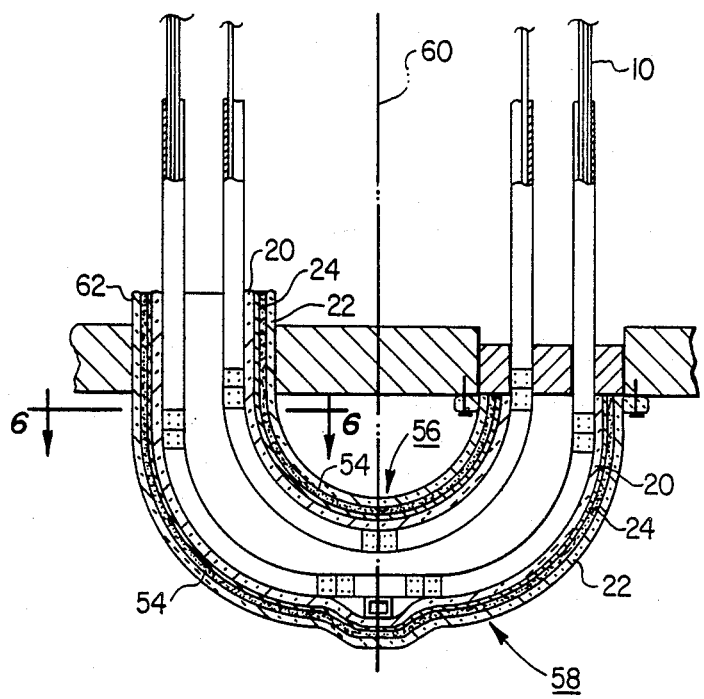
FIG. 5 is a sectional elevation of multiple cable trays to which the fire protection blankets have been applied.

In the description which follows, like parts are marked throughout the specification and drawing with the same reference numerals respectively. Drawing figures are not necessarily to scale and in certain views parts may be drawn rotated into the plane of the drawing for purposes of clarity.

Referring to the drawings, there is illustrated in FIG. 1 an installation in which a plurality of electrical cables 10 are manifolded and supported from hangers 12 on trays 14. Where extending beyond the trays, the cables are enclosed in conduit 16 (FIG. 2) and both the conduit and trays are wrapped by the fire protection blanket hereof designated 18.

Comprising blanket 18, as more specifically shown in FIGS. 2-4, is an inner blanket means of thermal insulating composition adapted to be placed juxtaposed to the surface of an article to be protected, 20, an outer blanket 20 of thermal insulating composition overlying the inner blanket means 20, 22 and a moisture impervious barrier means 24 held together at a shiplap joint 26 by stainless steel tie wire 28 and stainless steel lacing hooks 30, for example, or any other means suitable for assembling the inner blanket means 20 and theouter blanket means 22. The moisture impervious barrier means 24 is disposed between the inner blanket means and the outer blanket means. As best seen in FIG. 3, inner blanket 20 is comprised of opposite sections of fiberglass cloth 32 joined along the side edges by hog rings 34 so as to define internal cavity 36 of approximately 1 inch in height. Disposed within the cavity is a ceramic fiber blanket composition 38 preferably of alumina silica. Offsets 40 and 42 permit the blanket when folded into a circular formation to produce the shiplap joint 26 as described supra. For purposes of pipe wrap in the manner of FIG. 2, the overall height of inner blanket 20 is approximately 1 inch which is increased to approximately 3 inches when utilized on cable trays.

As best seen in FIG. 4, the outer blanket section 22 hereof is comprised of opposite sections of silica dioxide cloth 44 joined at its side edges by hog rings 46 and including shiplap joint offsets 40 and 42 as above. Internally defined within the upper portion thereof is a cavity 48 containing a 1½ inch thickness of ceramic fiber 49 of composition similar to 38 above. Supported beneath the cavity is a pillow seamed alternately stitched envelope 52 of fiberglass cloth containing a loosely packed fill of a free powdered hydrous oxide composition 54. In the preferred embodiment fill 54 is trihydrated alumina of thickness as will be described.

When assembled, the blanket hereof has an assembled thickness for purposes of cable wrap on the order of about 2½ inches and for tray wrap on the order of about 4½ to 5 inches. As described aforesaid, this is attributed to the difference in the thickness of the inner blanket 20 which is increased from about 1 inch to about 3 inches respectively. Each of the elements comprising the blanket sections are of course selected not only for their fire protection properties but also for their durability in the environments to which they are exposed and in their cost effectiveness enabling economical manufacture and assembly. For these purposes therefore, fiberglass cloth 32 is of a high quality composition commercially available from a variety of manufacturing sources such as Alpha 76281-4634; J. P. Stevens 3582 3910; and J. P. Stevens 2025. The ceramic fiber blankets 38 and 49 are nominal 1 inch and 1½ type respectively and are commercially available in 8 pound density from Johns-Manville as their Cerablanket 2400° F.; Babcock and Wilcox Koawool blanket 2300° F.; and Carborundum Durablanket 2300° F. Silica dioxide cloth 44 is available from Promatec of Houston, Tex. as their Siltemp S84 and/or 84 SRWR. Fibercloth 52 is similar to cloth 32 above and is stitched to form the staggered pillow block shown to effect juxtaposed tube type compartments containing fill 54. Other formations for envelope 52 could similarly be utilized. Finally, the trihydrate alumina 54 is likewise commercially available as trihydrate alumina grade 30 from companies such as Alcoa or B. Solem as their designated orders C30 and SB30 respectively. Critical thereto is that the composition of 54 be characterized by emitting a gaseous water vapor when exposed to surrounding temperatures of about 446° F. and above. Being that fill 54 is consumed at a more or less constant rate, utilizing greater or lesser thicknesses thereof tends to increase or decrease fire rating of the MT barrier respectively.

Figure 6:
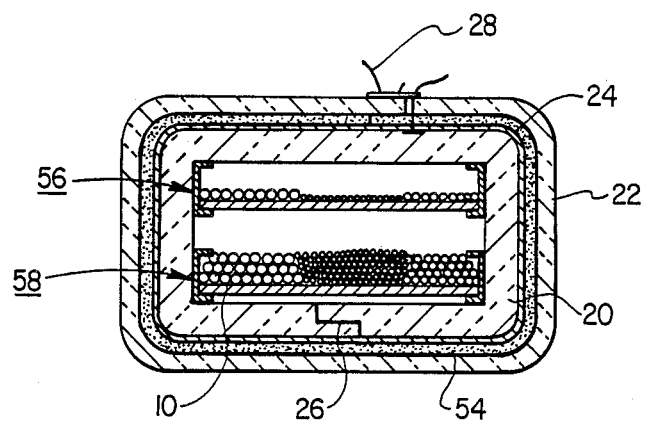
FIG. 6 is a sectional view taken substantially along the lines 6—6 of FIG. 5.

As illustrated in FIGS. 5 and 6, the blanket components are similar for protecting the multiple trays 56 and 58. On the left side of the center line 60 of FIG. 5 there is shown a ladder back construction whereas on the right side of the center line there is shown a solid back construction. Inner tray 56 as shown includes an inner blanket 20 on which is superimposed outer blanket 22 and separated therefrom by intervening moisture barrier 24. Outer tray 58 is similarly wrapped by inner blanket 20, outer blanket 22 and intervening moisture impervious foil 24. Securing the blankets together is a stainless steel banding 62.

Selection of the foregoing elements in the construction of the M.T. fire protection blankets hereof results in a 3 hour time barrier for the protection of electrical cable and/or trays in compliance with the aforementioned requirements of the Nuclear Regulatory Commission. By utilizing the various components in the arrangement described, the pipe wrap is about 2½ inch and the tray wrap is about 4½ inches in thickness with all the individual elements and their specific fire resistant properties contributing to the overall result obtained herewith. By therefore utilizing a relatively simple combination of components commercially available in a form not previously known in the art, a novel result is obtained in the form of retarding the adverse effects of fire on electrical systems. This enables the facility affected by fire to be readily and safely shut down and thereby prevent disastrous situations that could otherwise result from fire interruption of the electrical circuitry. Not only are the various blanket elements selected for their specific strength and thermal properties in the combination hereof, but also because of their economic considerations and ease of fabrication affecting their selection. Whereas a 3-hour time barrier has been selected in conforming with the aforementioned ASTM code requirements, it is obvious that a greater or lesser time barrier can be suitably adapted as required for an installation in which such a time barrier blanket wrap can be advantageously utilized. Such adaptation would merely require the matching of selected components with their associated thermal properties along with a selected thickness of the hydrous oxide powder for otherwise achieving a similar result as described above.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A flexible fire protection covering for providing time determined fire protection to an electrical article, said covering comprising:
   an inner blanket means of thermal insulating composition adapted to be placed contiguous to the surface of an article to be protected;
   an outer blanket means of thermal insulating composition overlying said inner blanket means;
   an amount of powdered hydrous oxide composition sufficient to emit a gaseous water vapor for a desired period of time upon exposure to surrounding temperatures of about 446° F. and above, said composition being confined within said outer blanket means; and
   a moisture impervious means disposed between said outer blanket means and said inner blanket means, which operates to shield said inner blanket means from vapor released by said powdered hydrous oxide composition.

2. A covering in accordance with claim 1 in which each of said inner and outer blanket means includes a predetermined thickness of a ceramic blanket composition.

3. A covering in accordance with claim 2 in which said ceramic blanket composition comprises alumina silica.

4. A covering in accordance with claim 1 in which said hydrous oxide comprises trihydrated alumina.

5. A covering in accordance with claim 1 in which said moisture impervious means comprises a layer of metal foil between said inner blanket means and said outer blanket means.

6. A flexible fire protection covering for providing time determined fire protection to an electrical article against which it is applied, said covering comprising:
   an inner blanket comprising a predetermined thickness of a ceramic fiber blanket composition adapted to be placed adjacent to the surface of an article to be protected;
   an outer blanket of ceramic fiber blanket composition overlying said inner blanket;
   an amount of powdered hydrous oxide composition sufficient to emit a gaseous water vapor for a desired period of time upon exposure to surrounding temperatures of about 446° F. and above, said composition being confined within said outer blanket so as to be placed between said ceramic blanket composition and said inner blanket; and
   a layer of metal foil between said inner blanket and said powdered hydrous oxide composition.

7. The covering of claim 6, wherein said ceramic blanket composition comprises alumina silica.

8. The covering of claim 6, wherein said powdered hydrous oxide is contained within a fiberglass cloth within said outer blanket.

9. The covering of claim 6, wherein said hydrous oxide comprises trihydrated alumina.

* * * * *

UNITED STATES PATENT AND TRADEMARK OFFICE
CERTIFICATE OF CORRECTION

PATENT NO. : 4,844,960
DATED     : July 4, 1989
INVENTOR(S) : Leonard C. Spriggs & William J. Chockey It is certified that error appears in the above-identified patent and that said Letters Patent is hereby corrected as shown below:

Col. 3, line 21, "of thermal insulating composition overlying the inner" should be --means of thermal insulating composition overlying the inner--.

Signed and Sealed this

Seventeenth Day of April, 1990

Attest:

HARRY F. MANBECK, JR.

*Attesting Officer*  *Commissioner of Patents and Trademarks*